United States Patent
Ryu et al.

(10) Patent No.: US 12,279,307 B2
(45) Date of Patent: Apr. 15, 2025

(54) UNLICENSED BAND CHANNEL ACCESS PROCEDURES FOR REDUCED USER EQUIPMENT (UE) COMPLEXITY

(71) Applicant: QUALCOMM Incorporated, San Diego, CA (US)

(72) Inventors: Jae Ho Ryu, San Diego, CA (US); Jing Sun, San Diego, CA (US); Vinay Chande, San Diego, CA (US); Hari Sankar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 447 days.

(21) Appl. No.: 17/939,516

(22) Filed: Sep. 7, 2022

(65) Prior Publication Data

US 2024/0080886 A1  Mar. 7, 2024

(51) Int. Cl.
*H04W 74/0808* (2024.01)
*H04W 8/24* (2009.01)
*H04W 16/14* (2009.01)

(52) U.S. Cl.
CPC ......... *H04W 74/0808* (2013.01); *H04W 8/24* (2013.01); *H04W 16/14* (2013.01)

(58) Field of Classification Search
CPC .... H04W 74/0808; H04W 8/24; H04W 16/14
See application file for complete search history.

(56) References Cited

U.S. PATENT DOCUMENTS

2016/0007350 A1* 1/2016 Xiong ................. H04W 24/10
                                                      370/252
2020/0267562 A1* 8/2020 Nam ................. H04L 27/2666

* cited by examiner

*Primary Examiner* — Natasha W Cosme
(74) *Attorney, Agent, or Firm* — ArentFox Schiff LLP

(57) ABSTRACT

Aspects of the present disclosure include methods, apparatuses, and computer-readable medium for transmitting a capability signal to a network entity, wherein the capability signal indicates whether the UE is capable of supporting an uplink (UL) bandwidth that is equal to or less than a downlink (DL) bandwidth for communication over an unlicensed band; and exchanging a signal between the UE and the network entity over the unlicensed band according to the capability signal. Some alternative or additional aspects include methods, apparatuses, and computer-readable medium for receiving a signal from a network entity, wherein the signal indicates that short control signal exemption (SCSt) is applied to a synchronization signal block (SSB) transmission of one or more network entities over an unlicensed band; and skipping SSB presence detection of the one or more network entities in response to the signal.

20 Claims, 8 Drawing Sheets

UNLICENSED BAND CHANNEL ACCESS PROCEDURES FOR REDUCED USER EQUIPMENT (UE) COMPLEXITY

BACKGROUND

The present disclosure relates generally to wireless communication systems, and more particularly, to techniques for wireless communication in an unlicensed band.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example aspect includes a method of wireless communication by a user equipment (UE). The method includes transmitting a capability signal to a network entity, wherein the capability signal indicates whether the UE is capable of supporting an uplink (UL) bandwidth that is equal to or less than a downlink (DL) bandwidth for communication over an unlicensed band. The method further includes exchanging a signal between the UE and the network entity over the unlicensed band according to the capability signal.

Another example aspect includes a user equipment (UE) comprising a memory storing instructions; and at least one processor coupled with the memory. The at least one processor is configured to execute the instructions to transmit a capability signal to a network entity, wherein the capability signal indicates whether the UE is capable of supporting an uplink (UL) bandwidth that is equal to or less than a downlink (DL) bandwidth for communication over an unlicensed band. The at least one processor is further configured to execute the instructions to exchange a signal between the UE and the network entity over the unlicensed band according to the capability signal.

Another example aspect includes a computer-readable medium having instructions stored thereon. The instructions, when executed by a processor, cause the processor to transmit a capability signal to a network entity, wherein the capability signal indicates whether the UE is capable of supporting an uplink (UL) bandwidth that is equal to or less than a downlink (DL) bandwidth for communication over an unlicensed band. The instructions, when executed by the processor, further cause the processor to exchange a signal between the UE and the network entity over the unlicensed band according to the capability signal.

Another example aspect includes an apparatus comprising means for transmitting a capability signal to a network entity, wherein the capability signal indicates whether the UE is capable of supporting an uplink (UL) bandwidth that is equal to or less than a downlink (DL) bandwidth for communication over an unlicensed band. The apparatus further comprises means for exchanging a signal between the UE and the network entity over the unlicensed band according to the capability signal.

Another example aspect includes a method of wireless communication by a user equipment (UE). The method includes receiving a signal from a network entity, wherein the signal indicates that short control signal exemption (SCSt) is applied to a synchronization signal block (SSB) transmission of one or more network entities over an unlicensed band. The method further includes skipping SSB presence detection of the one or more network entities in response to the signal.

Another example aspect includes a user equipment (UE) comprising a memory storing instructions; and at least one processor coupled with the memory. The at least one processor is configured to execute the instructions to receive a signal from a network entity, wherein the signal indicates that short control signal exemption (SCSt) is applied to a synchronization signal block (SSB) transmission of one or more network entities over an unlicensed band. The at least one processor is further configured to execute the instructions to skip SSB presence detection of the one or more network entities in response to the signal.

Another example aspect includes a computer-readable medium having instructions stored thereon. The instructions, when executed by a processor, cause the processor to receive a signal from a network entity, wherein the signal indicates that short control signal exemption (SCSt) is applied to a synchronization signal block (SSB) transmission of one or more network entities over an unlicensed band. The instructions, when executed by the processor, further cause the processor to skip SSB presence detection of the one or more network entities in response to the signal.

Another example aspect includes an apparatus comprising means for receiving a signal from a network entity, wherein the signal indicates that short control signal exemption (SCSt) is applied to a synchronization signal block (SSB) transmission of one or more network entities over an unlicensed band. The apparatus further comprises means for skipping SSB presence detection of the one or more network entities in response to the signal.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
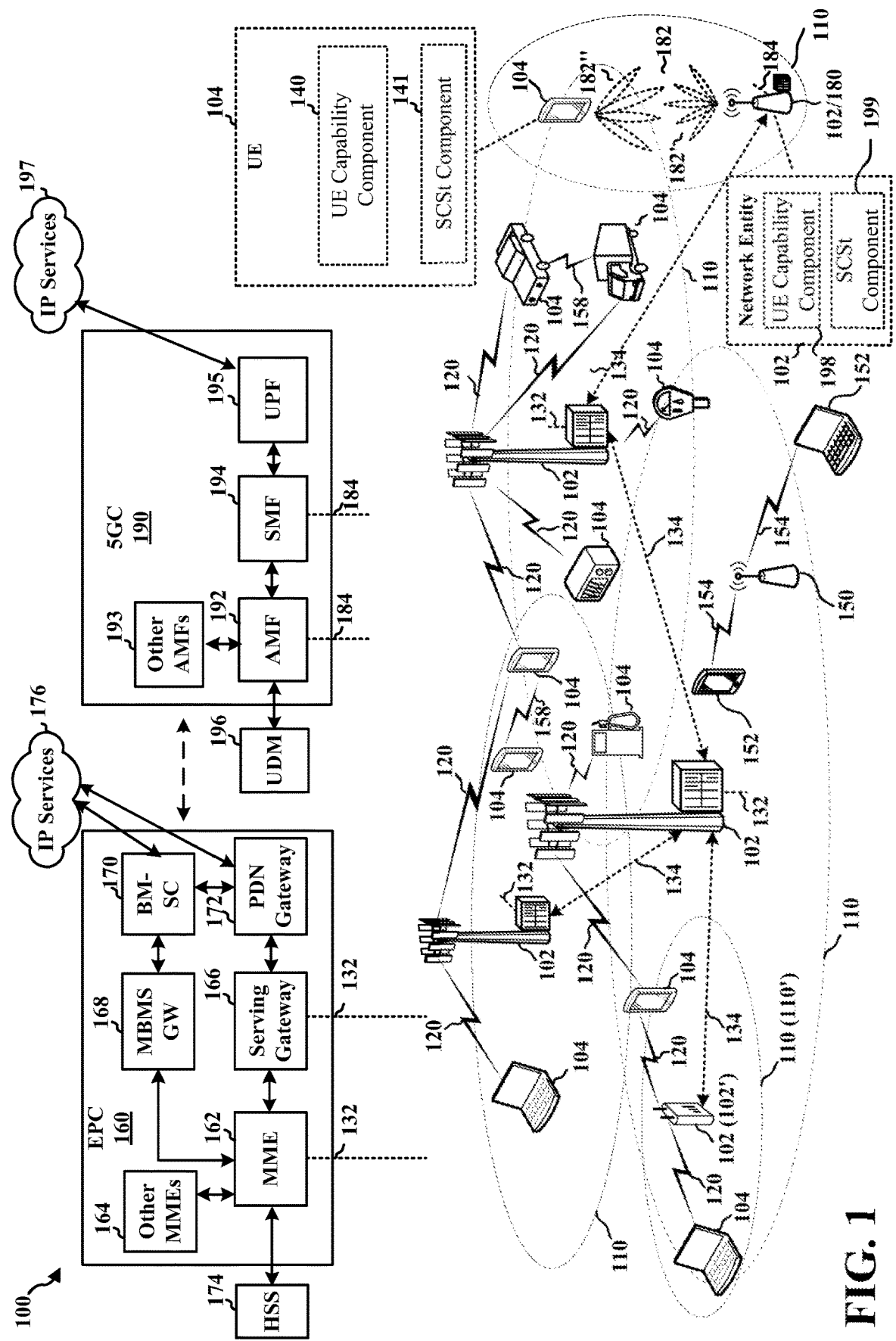
FIG. 1 is a diagram illustrating an example of a wireless communications system and an access network, including user equipment (UE) and base station components for communication over an unlicensed band, according to some aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts. Although the following description may be focused on 5G NR, the concepts described herein may be applicable to other similar areas, such as LTE, LTE-A, CDMA, GSM, and other wireless technologies.

Aspects of the present disclosure provide a user equipment (UE) capability report to indicate that a UE can support an uplink (UL) bandwidth part (BWP) that is equal to or less than a downlink (DL) BWP for communication over an unlicensed band. A BWP is defined as a number of contiguous resource blocks (RBs, such as physical RBs (PRBs)) on a frequency carrier. As such, an UL BWP that is equal to or less than a DL BWP means the UL BWP has a bandwidth that is equal to or less than the bandwidth of a DL BWP, e.g., a number of RBs of the UL BWP is equal to or less than a number of RBs of the DL BWP. Some alternative or additional aspects define an indication in a signal such as a synchronization signal block (SSB) to indicate that one or more cells are applying short control signal exemption (SCSt) to a synchronization signal block (SSB) transmission for communication over an unlicensed band.

The described aspects may enable the UE to coordinate with the base station or other network entity to reduce hardware cost and/or power consumption and/or increase efficiency. For instance, the UE sharing the UE capability report avoids the base station/network entity configuring the UL BWP to be larger than the DL BWP, which allows the UE to have a single configuration of receive chain components to perform both DL signal reception and listen-before-talk (LBT) sensing or clear channel assessment (CCA), thereby reducing hardware cost and/or power consumption. Also, the base station/network entity sharing of the indication of the SCSt avoids the UE from having to perform SSB presence detection before SSB measurement, thereby saving power and time. Further details of the present aspects are described below with reference to the appended drawings.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100 including a UE 104 and a network entity 102, also referred to herein as a base station 102 (e.g., a gNB) and/or a disaggregated base station, configured for communication over an unlicensed band. In an aspect, for example, the UE 104 may include a UE capability component 140 configured to report a capability to the network entity 102 to indicate that the UE 104 is capable of supporting a UL BWP that is equal to or smaller than a DL BWP, which can enable a single receive chain configuration at the UE 104. In some aspects, a UE capability component 198 in the base station 102 may provide corresponding functionality, e.g., to receive the capability reported by the UE capability component 140 of the UE 104, which can enable the network entity 102 to ensure DL and UL BWP configuration that is compatible with the capability of the UE 104. In an alternative or additional aspect, for example, the network entity 102 may include a short control signal exemption (SCSt) component 199 configured to transmit a signal to the UE 104 to indicate whether the network entity 102 and/or a neighboring cell is implementing SCSt, which enables the UE 104 to skip performing a LBT procedure and directly perform a synchronization signal block (SSB) measurement. In some aspects, a SCSt component 141 in the UE 104 may provide corresponding functionality, e.g., to receive the signal transmitted by the SCSt component 199 of the network entity 102. Further details of the operation of the UE capability component 140 and the SCSt component 141 of the UE 104 and the UE capability component 198 and the SCSt component 199 of the base station 102 are described below with reference to FIGS. 2A-2D and 3-8.

The wireless communications system (also referred to as a wireless wide area network (WWAN)) may also include other base stations 102, other UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5GNR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 132, 134, 184 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158, e.g., including synchronization signals. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

Figure 2:
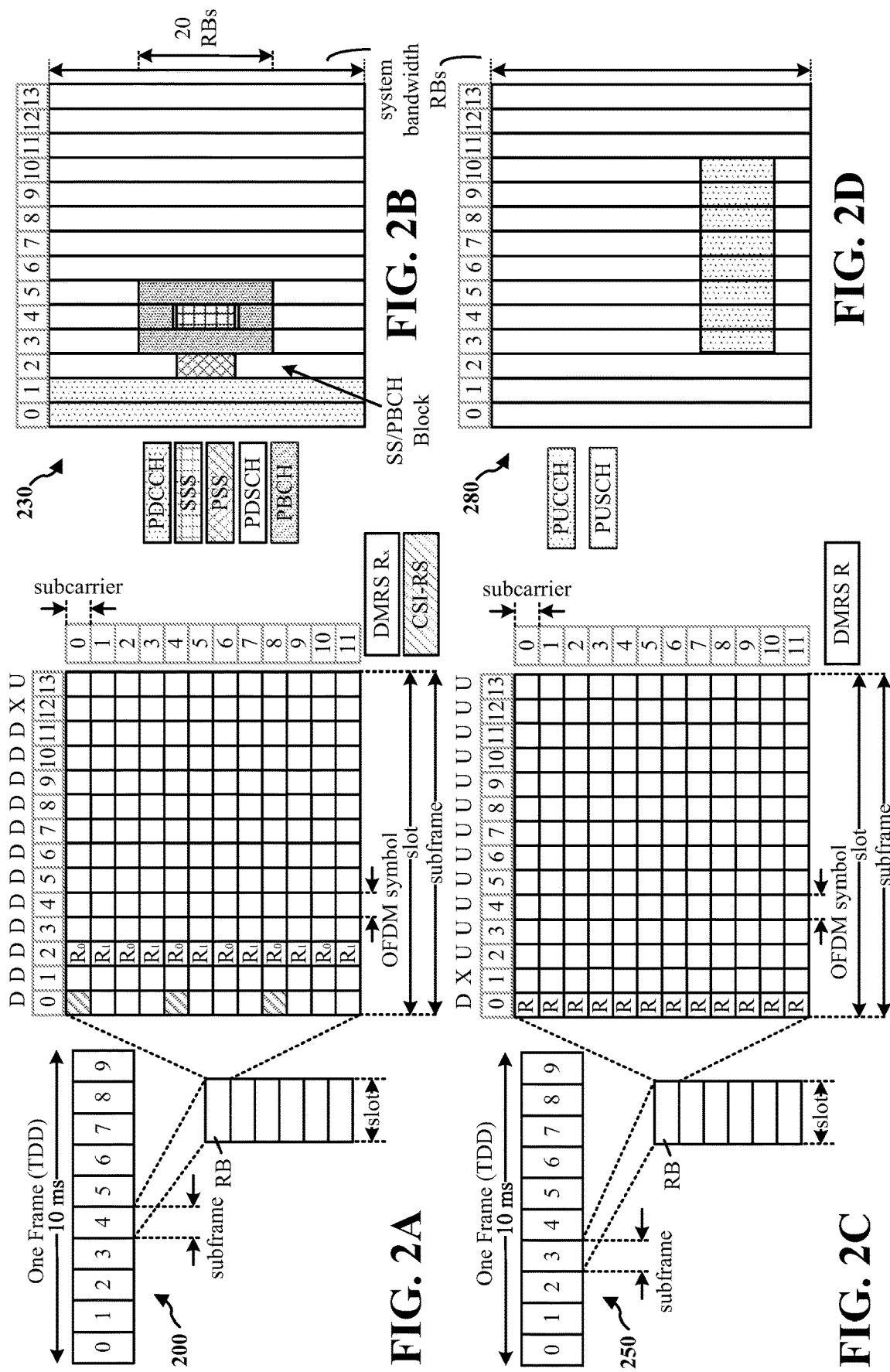
FIG. 2A is a diagram illustrating an example of a first 5G/NR frame for use in communication by the base stations and/or the UEs in FIG. 1, according to some aspects of the present disclosure.
FIG. 2B is a diagram illustrating an example of DL channels within a 5G/NR subframe for use in communication by the base stations and/or the UEs in FIG. 1, according to some aspects of the present disclosure.
FIG. 2C is a diagram illustrating an example of a second 5G/NR frame for use in communication by the base stations and/or the UEs in FIG. 1, according to some aspects of the present disclosure.
FIG. 2D is a diagram illustrating an example of UL channels within a 5G/NR subframe for use in communication by the base stations and/or the UEs in FIG. 1, according to some aspects of the present disclosure.

The base station 102 may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. Referring to FIGS. 2A-2D, one or more example frame structures, channels, and resources may be used for communication between the base stations 102 and the UEs 104 of FIG. 1. FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology u, there are 14 symbols/slot and $2^\mu$ slots/subframe. The subcarrier spacing and symbol length/duration are a function of the numerology. The subcarrier spacing may be equal to $2^\mu *15$ kHz, where µ is the numerology 0 to 5. As such, the numerology µ=0 has a subcarrier spacing of 15 kHz and the numerology µ=5 has a subcarrier spacing of 480 kHz. The symbol length/duration is inversely related to the subcarrier spacing. FIGS. 2A-2D provide an example of slot configuration 0 with 14 symbols per slot and numerology µ=0 with 1 slot per subframe. The subcarrier spacing is 15 kHz and symbol duration is approximately 66.7 its.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Some present aspects provide enhancements on unlicensed band channel access procedures to reduce UE complexity, where the unlicensed band may be, but is not limited to, frequency range 2-2 (FR2-2)~50-71 MHz.

In some cases, for unlicensed band operation in FR2-2, a UE is required to perform a channel access procedure such as listen-before-talk (LBT) sensing before UL transmission. In some aspects, LBT sensing is performed to make sure that a channel is idle and there is no ongoing transmission by other devices. In some aspects, LBT sensing may require several microseconds (us), e.g., 5 us or 8 us. For LBT sensing for single carrier transmission, a UE may perform LBT sensing over the channel bandwidth of UL BWP. For LBT sensing for multi-carrier transmission in intra-band carrier aggregation (CA), a UE may perform LBT sensing for each carrier separately. In these cases, there may not be support for partial bandwidth channel access for a given component carrier (CC) or for single LBT sensing covering multiple CCs.

Figure 3:
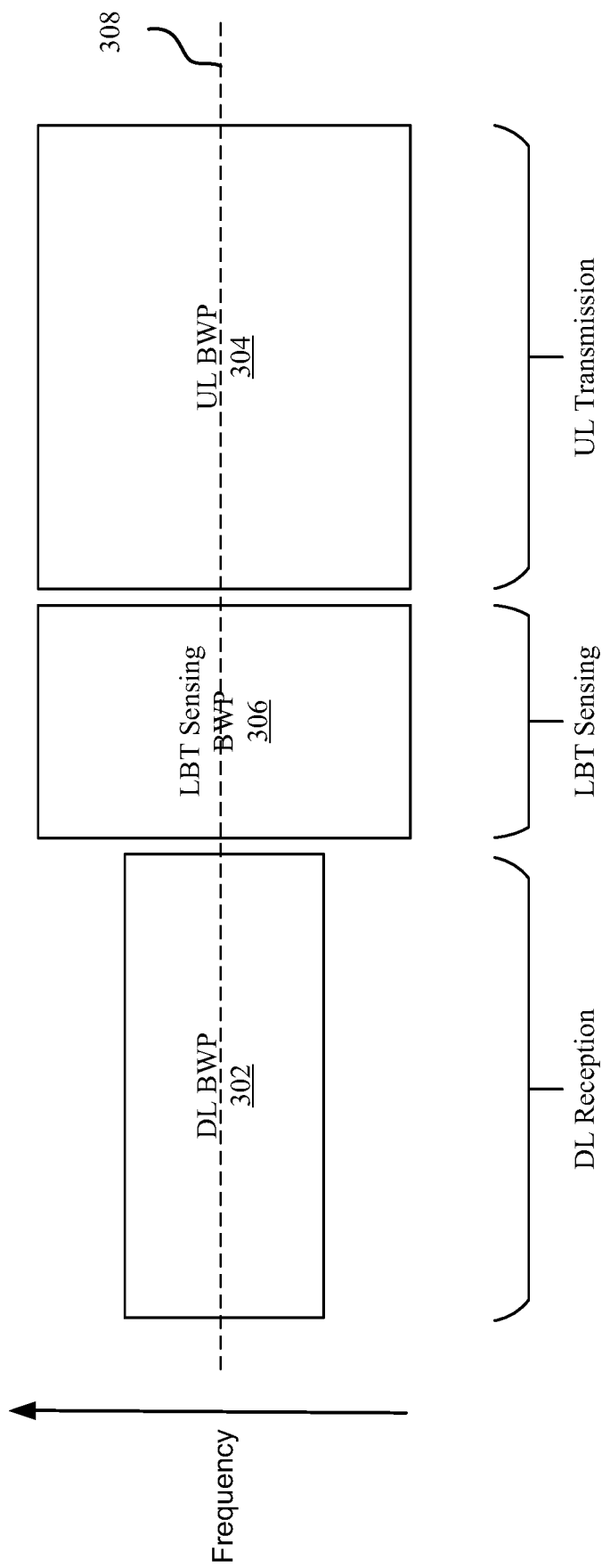
FIG. 3 is an example configuration of UL and DL bandwidth parts (BWPs), according to some aspects of the present disclosure.

Referring to FIG. 3, in some example aspects, there may be no constraint on the relationship between a DL BWP 302 and an UL BWP 304 in TDD communication. For example, for a TDD band, the DL BWP 302 and the UL BWP 304 may need to have the same center frequency 308, but may otherwise have different BWP sizes (e.g., may have different frequency bandwidths, or may include different number of PRBs). For example, the bandwidth of the UL BWP 304 may be larger than the bandwidth of the DL BWP 302. In this case, because the bandwidth of the UL BWP 304 is not covered by the bandwidth of the DL BWP 302, a UE may have to implement a dedicated receive chain ("Rx chain") for LBT sensing over LBT sensing BWP 306. In some aspects, for example, when a UE only has one Rx chain, re-tuning that Rx chain from the DL BWP 302 for DL reception to UL BWP 304 for LBT sensing may not be feasible, for example, when an available switching gap between DL transmission and LBT sensing is less than a threshold, e.g., less than 1 us. Also, tuning an Rx chain to cover both the DL BWP 302 and the UL BWP 304 may not be desirable due to the power consumption penalty of wider-than-needed bandwidth during DL reception.

In some cases, the LBT sensing BWP 306 is configured to be equal to or larger than the UL BWP 304. When the LBT sensing BWP 306 is the same as or within the DL BWP 302, a UE can share an Rx frond-end (RxFE) chain for DL signal reception and for LBT sensing. However, if the LBT sensing BWP 306 is larger than the DL BWP 302, a UE may configure the bandwidth of an RxFE to be equal to the LBT sensing BWP 306. If the maximum DL bandwidth is smaller than the LBT sensing BWP 306, there are unnecessary hardware area costs as well as higher-than-needed power consumption during DL communication. Also, when the maximum DL bandwidth is equal to or larger than the LBT sensing BWP 306, a UE may configure the bandwidth of the RxFE to be equal to the DL bandwidth, but this causes higher-than-needed power consumption during LBT sensing.

Alternatively, in some cases, a UE may implement separate RxFEs for DL reception and LBT sensing, but this causes an undesirable increase in hardware area cost, but may not incur a power consumption penalty.

In some present aspects, a UE may send a capability "UL-BWPInDL-BWP" to indicate that the UE can support an UL BWP that is equal to or smaller than a DL BWP in an unlicensed band such as, but not limited to, the FR2-2 unlicensed band. In this case, the UE can share an RxFE for DL signal reception and for LBT sensing. In these aspect, when the UE indicates such a capability in an unlicensed band, a network entity does not configure an UL BWP that is larger than a DL BWP for the UE in the unlicensed band.

In some cases, during unlicensed band operation, such as but not limited to FR2-2 unlicensed band operation, a network entity may drop synchronization signal block (SSB) transmission due to LBT failure. This may happen, for example, when a neighboring cell is already performing SSB transmission. In some cases, a discovery burst transmission window (DBTW) is specified to increase SSB transmission opportunities.

In some cases, a UE needs to periodically measure SSB during SSB burst to support DL operation, e.g., to support DL loop operation, radio link quality monitoring, RSRP measurement for mobility, etc. When operating in an unlicensed band, since the network entity may drop SSB transmission due to LBT failure, a UE needs to perform SSB presence detection (e.g., needs to determine whether there is SSB transmission during an SSB burst) before the UE can perform serving cell SSB measurement or neighbor cell SSB measurement. This increases the processing (e.g., the million instructions per second (MIPS)) required for SSB measurement and degrades SSB measurement performance/accuracy.

In some geographical regions, LBT-exempt transmission may be enabled/allowed for short control signals. Specifically, a short control signal exemption (SCSt) is specified for SSB transmission, where SCSt is defined to allow transmission of brief signals in an unlicensed band without requiring LBT sensing prior to such transmission. For SCSt implementation, a brief signal may be defined as a signal that take less than a certain percentage of a transmission period, e.g., less than 10% or 5% of the transmission period. In this case, a network entity may transmit an SSB without LBT sensing in regions where SCSt is allowed (e.g., SCSt may be enabled/allowed in Europe but not in Japan). However, if a UE is not aware of whether a network entity is or is not applying SCSt, the UE still needs to perform SSB presence detection before SSB measurement.

However, in some present aspects, a network entity may transmit an indication for SSB transmission with SCSt. For example, when the network entity applies SCSt to SSB transmission, the network entity provides a "SSB-TxWithSCSt" indication in SIB to indicate that SSB transmission in the cell is based on SCSt.

Alternatively or additionally, when the network entity knows that SSB transmission in a neighbor cell is based on SCSt, the network entity may indicate that to a UE by providing a "SSB-TxWithSCSt-Ncell" indication.

In some optional aspects, for example, "SSB-TxWithSCSt-Ncell" may be provided in SIB to indicate that SSB transmission in all neighbor cells are based on SCSt.

In some alternative optional aspects, for example, "SSB-TxWithSCSt-Ncell" may be provided in SIB3, in SIB4, or in "MeasObjectNR" configuration, to indicate that SSB transmission in all neighbor cells for a specific carrier frequency is based on SCSt. Accordingly, SCSt may be separately indicated for different frequencies. In some aspects, the network entity may obtain the information for SSB transmission based on SCSt for neighbor cells.

In some optional aspects, for example, the network entity may determine the SCSt information for SSB transmission of the neighbor cells according to the pre-configuration of a network deployment in a specific area.

In some alternative optional aspects, for example, the information for SSB transmission may be obtained from AMF via an NG interface.

In some alternative optional aspects, for example, the information for SSB transmission may be obtained from a neighbor network entity via an Xn interface.

Figure 4:
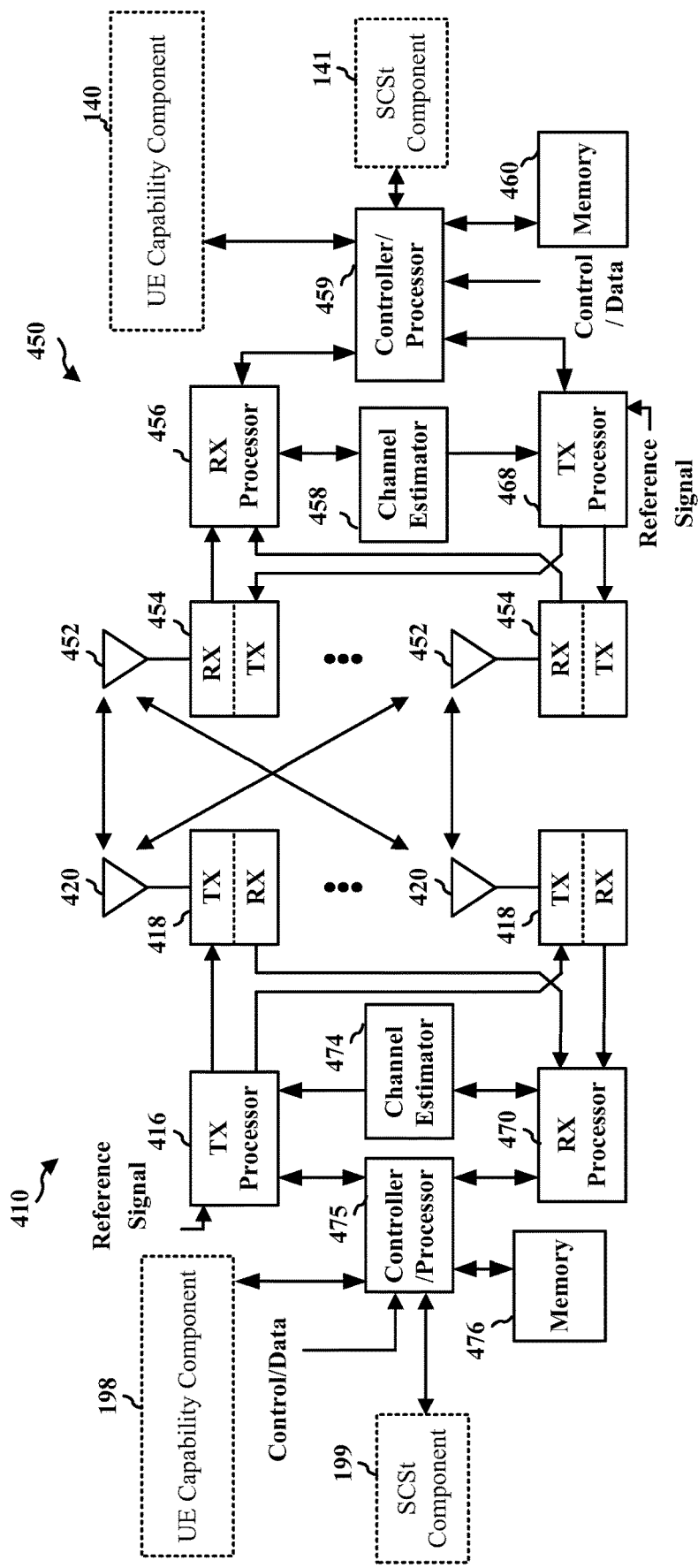
FIG. 4 is a diagram illustrating an example of a base station and a UE in an access network, according to some aspects of the present disclosure.

FIG. 4 is a block diagram of a base station 410 in communication with a UE 450 in an access network, where the base station 410 may be an example implementation of base station 102 and includes UE capability component 198 and SCSt component 199, and where the UE 450 may be an example implementation of UE 104 and includes UE capability component 140 and SCSt component 141. In the DL, IP packets from the EPC 160 may be provided to a controller/processor 475. The controller/processor 475 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 475 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 416 and the receive (RX) processor 470 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 416 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 474 may be used to determine the coding and modulation scheme, as well as for spatial processing. The channel estimate may be derived from a reference signal and/or channel condition feedback transmitted by the UE 450. Each spatial stream may then be provided to a different antenna 420 via a separate transmitter 418TX. Each transmitter 418TX may modulate an RF carrier with a respective spatial stream for transmission.

At the UE 450, each receiver 454RX receives a signal through its respective antenna 452. Each receiver 454RX recovers information modulated onto an RF carrier and provides the information to the receive (RX) processor 456. The TX processor 468 and the RX processor 456 implement layer 1 functionality associated with various signal processing functions. The RX processor 456 may perform spatial processing on the information to recover any spatial streams destined for the UE 450. If multiple spatial streams are destined for the UE 450, they may be combined by the RX processor 456 into a single OFDM symbol stream. The RX processor 456 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 410. These soft decisions may be based on channel estimates computed by the channel estimator 458. The soft decisions are then decoded and deinterleaved to recover the data and control signals that were originally transmitted by the base station 410 on the physical channel. The data and control signals are then provided to the controller/processor 459, which implements layer 3 and layer 2 functionality. The controller/processor 459 can be associated with a memory 460 that stores program codes and data. The memory 460 may be referred to as a computer-readable medium. In the UL, the controller/processor 459 provides demultiplexing between transport and logical channels, packet reassembly, deciphering, header decompression, and control signal processing to recover IP packets from the EPC 160. The controller/processor 459 is also responsible for error detection using an ACK and/or NACK protocol to support HARQ operations.

Similar to the functionality described in connection with the DL transmission by the base station 410, the controller/processor 459 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 458 from a reference signal or feedback transmitted by the base station 410 may be used by the TX processor 468 to select the appropriate coding and modulation schemes, and to facilitate spatial processing. The spatial streams generated by the TX processor 468 may be provided to different antenna 452 via separate transmitters 454TX. Each transmitter 454TX may modulate an RF carrier with a respective spatial stream for transmission.

The UL transmission is processed at the base station 410 in a manner similar to that described in connection with the receiver function at the UE 450. Each receiver 418RX receives a signal through its respective antenna 420. Each receiver 418RX recovers information modulated onto an RF carrier and provides the information to a RX processor 470.

The controller/processor 475 can be associated with a memory 476 that stores program codes and data. The memory 476 may be referred to as a computer-readable medium. In the UL, the controller/processor 475 provides demultiplexing between transport and logical channels, packet reassembly, deciphering, header decompression, control signal processing to recover IP packets from the UE 450. IP packets from the controller/processor 475 may be provided to the EPC 160. The controller/processor 475 is also responsible for error detection using an ACK and/or NACK protocol to support HARQ operations.

At least one of the TX processor 468, the RX processor 456, and the controller/processor 459 may be configured to perform aspects described herein in connection with UE capability component 140 in the UE 104 of FIG. 1.

At least one of the TX processor 416, the RX processor 470, and the controller/processor 475 may be configured to perform aspects described herein in connection with UE capability component 198 in the network entity 102 of FIG. 1.

At least one of the TX processor 468, the RX processor 456, and the controller/processor 459 may be configured to perform aspects described herein in connection with SCSt component 141 in the UE 104 of FIG. 1.

At least one of the TX processor 416, the RX processor 470, and the controller/processor 475 may be configured to perform aspects described herein in connection with SCSt component 199 in the network entity 102 of FIG. 1.

Figure 5:
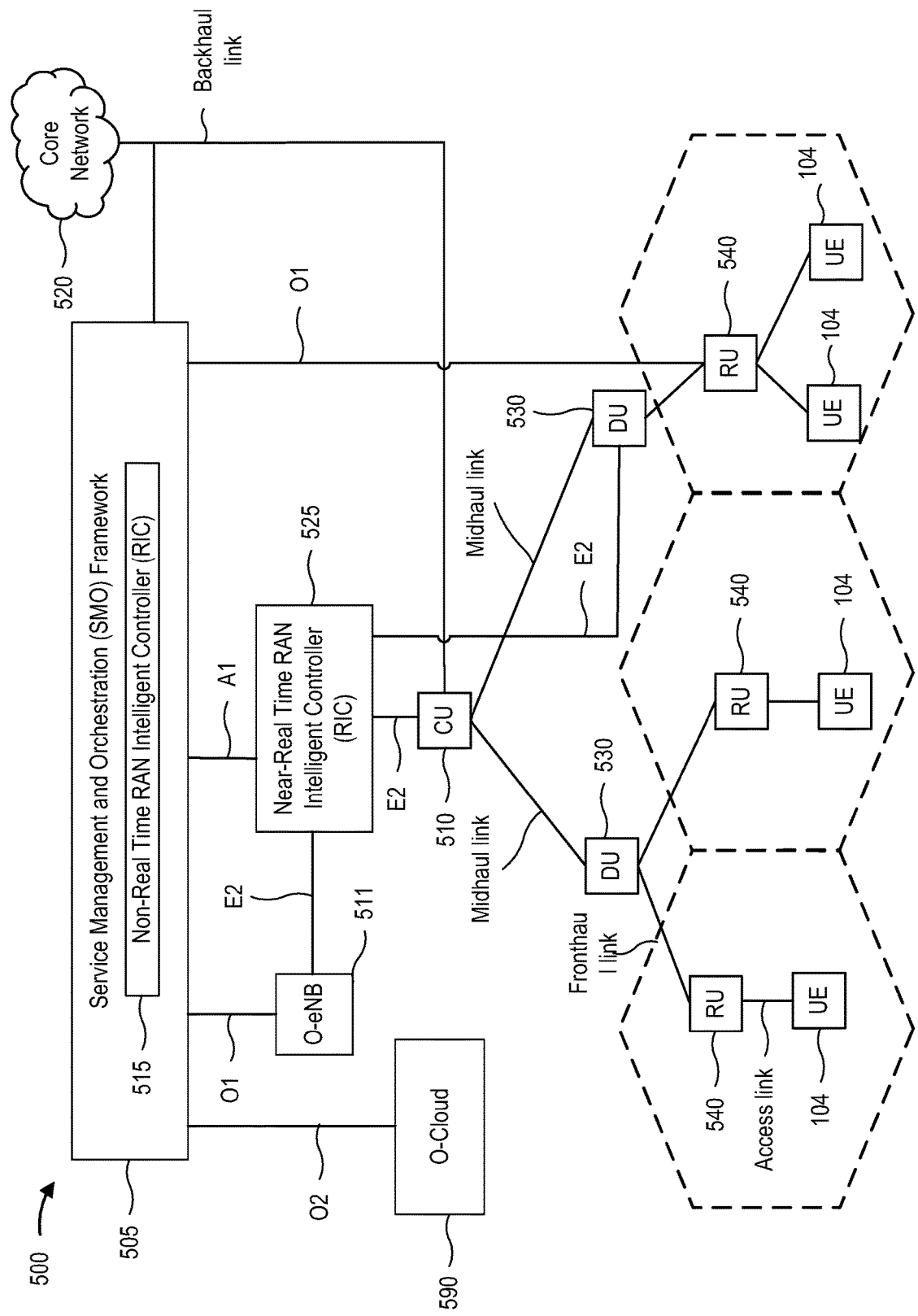
FIG. 5 is a diagram illustrating an example of disaggregated base station architecture, according to some aspects of the present disclosure.

Referring to FIG. 5, an example of disaggregated base station 500 architecture includes one or more components that may act as a network device as described herein. The disaggregated base station 500 architecture may include one or more central units (CUs) 510 that can communicate directly with a core network 520 via a backhaul link, or indirectly with the core network 520 through one or more disaggregated base station units (such as a Near-Real Time (Near-RT) RAN Intelligent Controller (RIC) 525 via an E2 link, or a Non-Real Time (Non-RT) RIC 515 associated with a Service Management and Orchestration (SMO) Framework 505, or both). A CU 510 may communicate with one or more distributed units (DUs) 530 via respective midhaul links, such as an F1 interface. The DUs 530 may communicate with one or more radio units (RUs) 540 via respective fronthaul links. The RUs 540 may communicate with respective UEs 104 via one or more radio frequency (RF) access links. In some implementations, the UE 104 may be simultaneously served by multiple RUs 540.

Each of the units, e.g., the CUs 510, the DUs 530, the RUs 540, as well as the Near-RT RICs 525, the Non-RT RICs 515 and the SMO Framework 505, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 510 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 510. The CU 510 may be configured to handle user plane functionality (i.e., Central Unit—User Plane (CU-UP)), control plane functionality (i.e., Central Unit—Control Plane (CU-CP)), or a combination thereof. In some implementations, the CU 510 can be logically split into one or more CU-UP units and one or more CU-CP units. The CU-UP unit can communicate bidirectionally with the CU-CP unit via an interface, such as the E1 interface when implemented in an O-RAN configuration. The CU 510 can be implemented to communicate with the DU 530, as necessary, for network control and signaling.

The DU 530 may correspond to a logical unit that includes one or more base station functions to control the operation of one or more RUs 540. In some aspects, the DU 530 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the third Generation Partnership Project (3GPP). In some aspects, the DU 530 may further host one or more low PHY layers. Each layer (or module) can be implemented with an interface configured to communicate signals with other layers (and modules) hosted by the DU 530, or with the control functions hosted by the CU 510.

Lower-layer functionality can be implemented by one or more RUs 540. In some deployments, an RU 540, controlled by a DU 530, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 540 can be implemented to handle over the air (OTA) communication with one or more UEs 104. In some implementations, real-time and non-real-time aspects of control and user plane communication with the RU(s) 540 can be controlled by the corresponding DU 530. In some scenarios, this configuration can enable the DU(s) 530 and the CU 510 to be implemented in a cloud-based RAN architecture, such as a vRAN architecture.

The SMO Framework 505 may be configured to support RAN deployment and provisioning of non-virtualized and virtualized network elements. For non-virtualized network elements, the SMO Framework 505 may be configured to support the deployment of dedicated physical resources for RAN coverage requirements which may be managed via an operations and maintenance interface (such as an O1 interface). For virtualized network elements, the SMO Framework 505 may be configured to interact with a cloud computing platform (such as an open cloud (O-Cloud) 590) to perform network element life cycle management (such as to instantiate virtualized network elements) via a cloud computing platform interface (such as an O2 interface). Such virtualized network elements can include, but are not limited to, CUs 510, DUs 530, RUs 540 and Near-RT RICs 525. In some implementations, the SMO Framework 505 can communicate with a hardware aspect of a 4G RAN, such as an open eNB (O-eNB) 511, via an O1 interface. Additionally, in some implementations, the SMO Framework 505 can communicate directly with one or more RUs 540 via an O1 interface. The SMO Framework 505 also may include a Non-RT RIC 515 configured to support functionality of the SMO Framework 505.

The Non-RT RIC 515 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 525. The Non-RT RIC 515 may be coupled to or communicate with (such as via an A1 interface) the Near-RT RIC 525. The Near-RT RIC 525 may be configured to include a logical function that enables near-real-time control and optimization of RAN elements and resources via data collection and actions over an interface (such as via an E2 interface) connecting one or more CUs 510, one or more DUs 530, or both, as well as an O-eNB, with the Near-RT RIC 525.

In some implementations, to generate AI/ML models to be deployed in the Near-RT RIC 525, the Non-RT RIC 515 may receive parameters or external enrichment information from external servers. Such information may be utilized by the Near-RT RIC 525 and may be received at the SMO Framework 505 or the Non-RT RIC 515 from non-network data sources or from network functions. In some examples, the Non-RT RIC 515 or the Near-RT RIC 525 may be configured to tune RAN behavior or performance. For example, the Non-RT RIC 515 may monitor long-term trends and patterns for performance and employ AI/ML models to perform corrective actions through the SMO Framework 505 (such as reconfiguration via O1) or via creation of RAN management policies (such as A1 policies).

Figure 6:
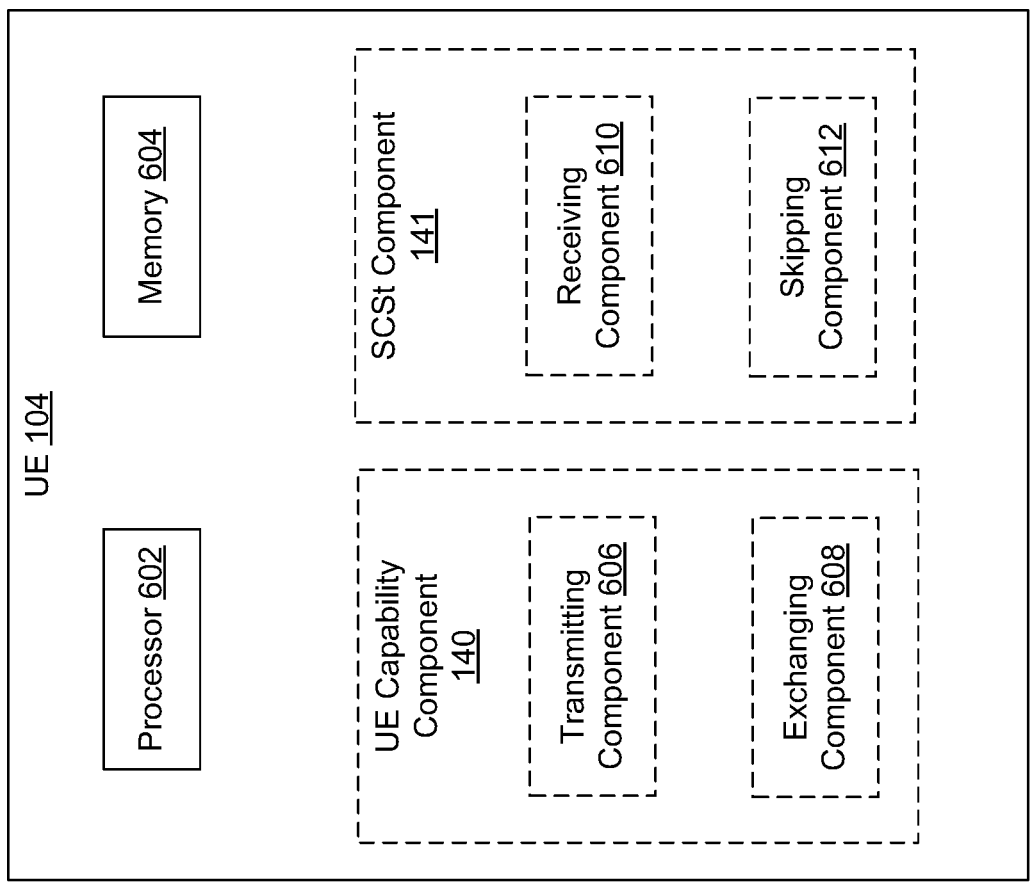
FIG. 6 is a block diagram of an example UE configured for communication over an unlicensed band, according to some aspects of the present disclosure.
Figure 7:
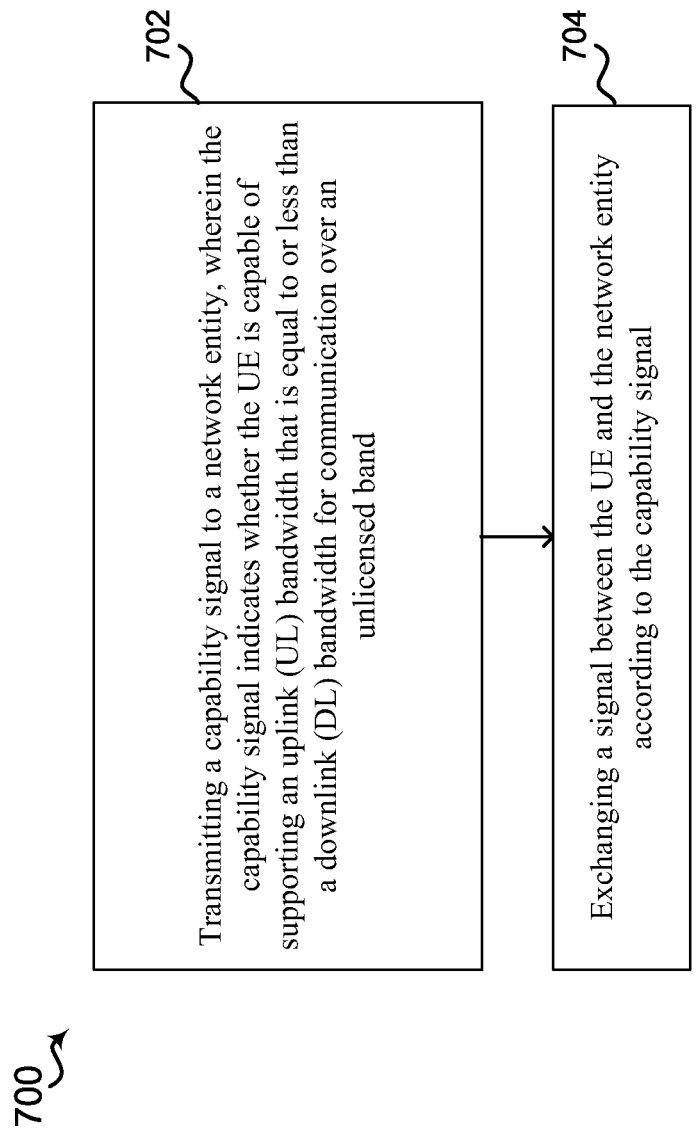
FIG. 7 is a flowchart of a first example method of wireless communication by a UE, according to some aspects of the present disclosure.
Figure 8:
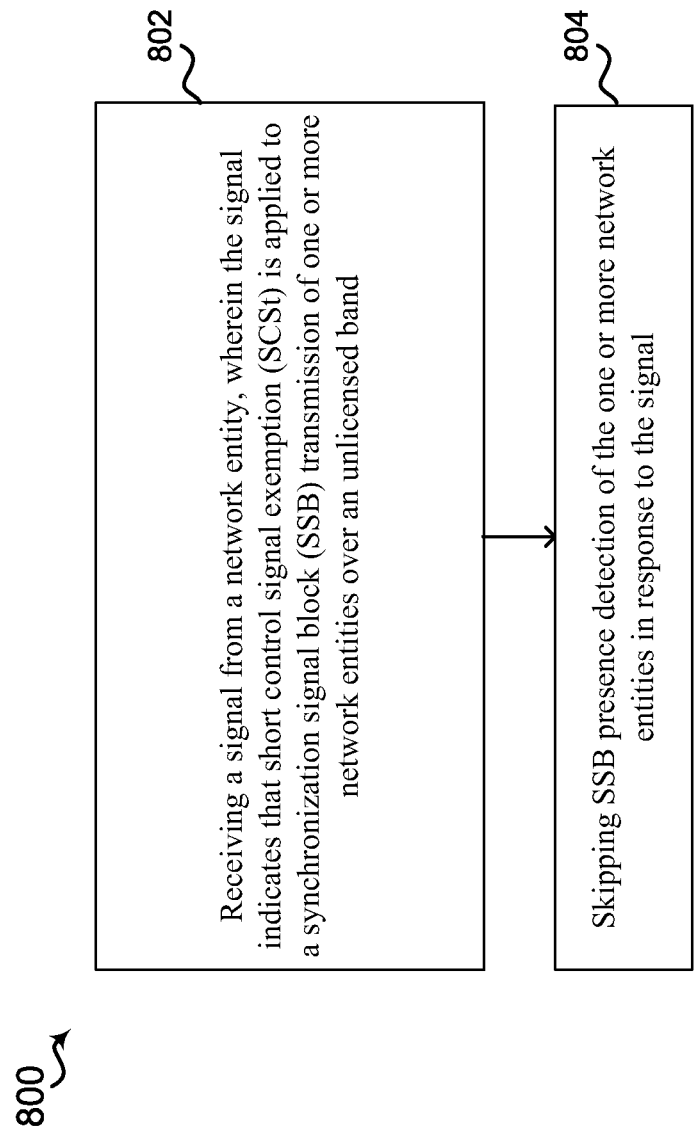
FIG. 8 is a flowchart of a second example method of wireless communication by a UE, according to some aspects of the present disclosure.

Referring to FIGS. 6-8, in operation, the UE 104 may perform a method 700 and/or a method 800 of wireless communication, by such as via execution of a respective one of UE capability component 140 or SCSt component 141 by processor 602 and/or memory 604. In this and other implementations described herein, the processor 602 may include at least one of the TX processor 468, the RX processor 456, and the controller/processor 459 described above, and the memory 604 may include memory 460 described above.

Referring first to FIG. 7, at block 702 the method 700 includes transmitting a capability signal to a network entity, wherein the capability signal indicates whether the UE is capable of supporting an uplink (UL) bandwidth that is equal to or less than a downlink (DL) bandwidth for communication over an unlicensed band. For example, in an aspect, UE 104, processor 602, memory 604, UE capability component 140, and/or transmitting component 606 may be configured to or may comprise means for transmitting a capability signal to a network entity, wherein the capability signal indicates whether the UE is capable of supporting an uplink (UL) bandwidth that is equal to or less than a downlink (DL) bandwidth for communication over an unlicensed band.

For example, in one non-limiting example aspect, a UE 104 may transmit a capability signal to a network entity 102 to indicate whether the UE 104 is capable of supporting a UL bandwidth that is equal to or less than a DL bandwidth for communication over an unlicensed band.

At block 704, the method 700 includes exchanging a signal between the UE and the network entity over the unlicensed band according to the capability signal. For example, in an aspect, UE 104, processor 602, memory 604, UE capability component 140, and/or exchanging component 608 may be configured to or may comprise means for exchanging a signal between the UE and the network entity over the unlicensed band according to the capability signal.

For example, in one non-limiting aspect, the UE 104 and the network entity 102 may exchange a signal over the unlicensed band according to the capability signal. In some optional implementations, the DL bandwidth comprises a DL bandwidth part (BWP), and the UL bandwidth comprises a UL BWP.

In some optional implementations, the capability signal indicates that the UE is only capable of supporting the UL BWP that is equal to or less than the DL BWP.

In some optional implementations, exchanging the signal comprises configuring a receive front end (RxFE) of the UE for both DL signal reception and listen-before-talk (LBT) sensing.

In some optional implementations, exchanging the signal comprises receiving the signal from the network entity, wherein the signal indicates the DL BWP and the UL BWP that is equal to or less than the DL BWP.

In some optional implementations, the unlicensed band requires listen-before-talk (LBT) sensing.

It should be understood that base station/network entity 102 may execute UE capability component 198 to perform the corresponding actions described herein.

Referring next to FIG. 8, at block 802 the method 800 includes receiving a signal from a network entity, wherein the signal indicates that short control signal exemption (SCSt) is applied to a synchronization signal block (SSB) transmission of one or more network entities over an unlicensed band. For example, in an aspect, UE 104, processor 602, memory 604, SCSt component 141, and/or receiving component 610 may be configured to or may comprise means for receiving a signal from a network entity, wherein the signal indicates that short control signal exemption (SCSt) is applied to a synchronization signal block (SSB) transmission of one or more network entities over an unlicensed band.

For example, in one non-limiting example aspect, a UE 104 may receive a signal from a network entity 102, wherein the signal indicates that SCSt is applied to a SSB transmission of one or more network entities over an unlicensed band.

At block 804, the method 800 includes skipping SSB presence detection of the one or more network entities in response to the signal. For example, in an aspect, UE 104, processor 602, memory 604, SCSt component 141, and/or skipping component 612 may be configured to or may comprise means for skipping SSB presence detection of the one or more network entities in response to the signal.

For example, in one non-limiting aspect, the UE 104 skips SSB presence detection of the one or more network entities in response to the signal indicating that SCSt is applied to a SSB transmission of the one or more network entities over an unlicensed band.

In some optional implementations, the signal indicates that the SCSt is applied to the SSB transmission of the network entity.

In some optional implementations, the signal comprises a system information block (SIB).

In some optional implementations, the signal indicates that the SCSt is applied to the SSB transmission of a neighboring cell.

In some optional implementations, the signal comprises a system information block (SIB).

In some optional implementations, the signal indicates that the SCSt is applied to the SSB transmission of all neighboring cells.

In some optional implementations, the signal comprises a system information block (SIB).

In some optional implementations, the signal comprises a SIB4, a SIB5, or a configuration signal indicating that the SCSt is applied to the SSB transmission of all neighboring cells in a specific carrier frequency.

It should be understood that base station/network entity 102 may execute SCSt component 199 to perform the corresponding actions described herein.

Some further aspects are provided below.

1. A method of wireless communication by a user equipment (UE), comprising:
    transmitting a capability signal to a network entity, wherein the capability signal indicates whether the UE is capable of supporting an uplink (UL) bandwidth that is equal to or less than a downlink (DL) bandwidth for communication over an unlicensed band; and
    exchanging a signal between the UE and the network entity over the unlicensed band according to the capability signal.
2. The method of clause 1, wherein the DL bandwidth comprises a DL bandwidth part (BWP), wherein the UL bandwidth comprises a UL BWP.
3. The method of clause 1 or 2, wherein the capability signal indicates that the UE is only capable of supporting the UL BWP that is equal to or less than the DL BWP.
4. The method of any one of clauses 1 to 3, wherein exchanging the signal comprises configuring a receive front end (RxFE) of the UE for both DL signal reception and listen-before-talk (LBT) sensing.
5. The method of any one of clauses 1 to 4, wherein exchanging the signal comprises receiving the signal from the network entity, wherein the signal indicates the DL BWP and the UL BWP that is equal to or less than the DL BWP.
6. The method of any one of clauses 1 to 5, wherein the unlicensed band requires listen-before-talk (LBT) sensing.
7. A user equipment (UE) comprising:
a memory storing instructions; and
at least one processor coupled with the memory and configured to execute the instructions to:
transmit a capability signal to a network entity, wherein the capability signal indicates whether the UE is capable of supporting an uplink (UL) bandwidth that is equal to or less than a downlink (DL) bandwidth for communication over an unlicensed band; and
exchange a signal between the UE and the network entity over the unlicensed band according to the capability signal.
8. The UE of clause 7, wherein the DL bandwidth comprises a DL bandwidth part (BWP), wherein the UL bandwidth comprises a UL BWP.
9. The UE of clause 7 or 8, wherein the capability signal indicates that the UE is only capable of supporting the UL BWP that is equal to or less than the DL BWP.
10. The UE of any one of clauses 7 to 9, wherein exchanging the signal comprises configuring a receive front end (RxFE) of the UE for both DL signal reception and listen-before-talk (LBT) sensing.
11. The UE of any one of clauses 7 to 10, wherein exchanging the signal comprises receiving the signal from the network entity, wherein the signal indicates the DL BWP and the UL BWP that is equal to or less than the DL BWP.
12. The UE of any one of clauses 7 to 11, wherein the unlicensed band requires listen-before-talk (LBT) sensing.
12-1. An apparatus comprising means for performing the method of any one of clauses 1 to 6.
12-2. A computer-readable medium storing instructions that, when executed by a processor, cause the processor to perform the method of any one of clauses 1 to 6.
13. A method of wireless communication by a user equipment (UE), comprising: receiving a signal from a network entity, wherein the signal indicates that short control signal exemption (SCSt) is applied to a synchronization signal block (SSB) transmission of one or more network entities over an unlicensed band; and
skipping SSB presence detection of the one or more network entities in response to the signal.
14. The method of clause 13, wherein the signal indicates that the SCSt is applied to the SSB transmission of the network entity.
15. The method of clause 13 or 14, wherein the signal comprises a system information block (SIB).
16. The method of any one of clauses 13 to 15, wherein the signal indicates that the SCSt is applied to the SSB transmission of a neighboring cell.
17. The method of any one of clauses 13 to 16, wherein the signal comprises a system information block (SIB).
18. The method of any one of clauses 13 to 17, wherein the signal indicates that the SCSt is applied to the SSB transmission of all neighboring cells.
19. The method of any one of clauses 13 to 18, wherein the signal comprises a system information block (SIB).
20. The method of any one of clauses 13 to 19, wherein the signal comprises a SIB4, a SIB5, or a configuration signal indicating that the SCSt is applied to the SSB transmission of all neighboring cells in a specific carrier frequency.
21. A user equipment (UE) comprising:
a memory storing instructions; and
at least one processor coupled with the memory and configured to execute the instructions to perform the method of any one of clauses 13 to 20.
22. An apparatus comprising means for performing the method of any one of clauses 13 to 20.
23. A computer-readable medium storing instructions that, when executed by a processor, cause the processor to perform the method of any one of clauses 13 to 20.
101. A method of wireless communication by a network entity, comprising:
receiving a capability signal from a user equipment (UE), wherein the capability signal indicates whether the UE is capable of supporting an uplink (UL) bandwidth that is equal to or less than a downlink (DL) bandwidth for communication over an unlicensed band; and
exchanging a signal between the UE and the network entity over the unlicensed band according to the capability signal.
102. The method of clause 101, wherein the DL bandwidth comprises a DL bandwidth part (BWP), wherein the UL bandwidth comprises a UL BWP.
103. The method of clause 101 or 102, wherein the capability signal indicates that the UE is only capable of supporting the UL BWP that is equal to or less than the DL BWP.
104. The method of any one of clauses 101 to 103, wherein a receive front end (RxFE) of the UE is configured for both DL signal reception and listen-before-talk (LBT) sensing.
105. The method of any one of clauses 101 to 104, wherein exchanging the signal comprises transmitting the signal to the UE, wherein the signal indicates the DL BWP and the UL BWP that is equal to or less than the DL BWP.
106. The method of any one of clauses 101 to 105, wherein the unlicensed band requires listen-before-talk (LBT) sensing.
107. A network entity comprising:
a memory storing instructions; and
at least one processor coupled with the memory and configured to execute the instructions to:
receive a capability signal from a user equipment (UE), wherein the capability signal indicates whether the UE is capable of supporting an uplink (UL) bandwidth that is equal to or less than a downlink (DL) bandwidth for communication over an unlicensed band; and
exchange a signal between the UE and the network entity over the unlicensed band according to the capability signal.
108. The network entity of clause 107, wherein the DL bandwidth comprises a DL bandwidth part (BWP), wherein the UL bandwidth comprises a UL BWP.
109. The network entity of clause 107 or 108, wherein the capability signal indicates that the UE is only capable of supporting the UL BWP that is equal to or less than the DL BWP.

110. The network entity of any one of clauses 107 to 109, wherein a receive front end (RxFE) of the UE is configured for both DL signal reception and listen-before-talk (LBT) sensing.

111. The network entity of any one of clauses 107 to 110, wherein exchanging the signal comprises transmitting the signal to the UE, wherein the signal indicates the DL BWP and the UL BWP that is equal to or less than the DL BWP.

112. The network entity of any one of clauses 107 to 111, wherein the unlicensed band requires listen-before-talk (LBT) sensing.

112-1. An apparatus comprising means for performing the method of any one of clauses 101 to 106.

112-2. A computer-readable medium storing instructions that, when executed by a processor, cause the processor to perform the method of any one of clauses 101 to 106.

113. A method of wireless communication by a network entity, comprising: transmitting a signal to a user equipment (UE), wherein the signal indicates that short control signal exemption (SCSt) is applied to a synchronization signal block (SSB) transmission of one or more network entities over an unlicensed band; and exchanging a signal between the UE and the network entity over the unlicensed band according to the signal.

114. The method of clause 113, wherein the signal indicates that the SCSt is applied to the SSB transmission of the network entity.

115. The method of clause 113 or 114, wherein the signal comprises a system information block (SIB).

116. The method of any one of clauses 113 to 115, wherein the signal indicates that the SCSt is applied to the SSB transmission of a neighboring cell.

117. The method of any one of clauses 113 to 116, wherein the signal comprises a system information block (SIB).

118. The method of any one of clauses 113 to 117, wherein the signal indicates that the SCSt is applied to the SSB transmission of all neighboring cells.

119. The method of any one of clauses 113 to 118, wherein the signal comprises a system information block (SIB).

120. The method of any one of clauses 113 to 119, wherein the signal comprises a SIB4, a SIB5, or a configuration signal indicating that the SCSt is applied to the SSB transmission of all neighboring cells in a specific carrier frequency.

121. A network entity comprising:
a memory storing instructions; and
at least one processor coupled with the memory and configured to execute the instructions to perform the method of any one of clauses 113 to 120.

122. An apparatus comprising means for performing the method of any one of clauses 113 to 120.

123. A computer-readable medium storing instructions that, when executed by a processor, cause the processor to perform the method of any one of clauses 113 to 120.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication by a user equipment (UE), comprising:
transmitting a capability signal to a network entity, wherein the capability signal indicates whether the UE is capable of supporting an uplink (UL) bandwidth that is equal to or less than a downlink (DL) bandwidth for communication over an unlicensed band; and
exchanging a signal between the UE and the network entity over the unlicensed band according to the capability signal.

2. The method of claim 1, wherein the DL bandwidth comprises a DL bandwidth part (BWP), wherein the UL bandwidth comprises a UL BWP.

3. The method of claim 2, wherein the capability signal indicates that the UE is only capable of supporting the UL BWP that is equal to or less than the DL BWP.

4. The method of claim 3, wherein exchanging the signal comprises configuring a receive front end (RxFE) of the UE for both DL signal reception and listen-before-talk (LBT) sensing.

5. The method of claim 3, wherein exchanging the signal comprises receiving the signal from the network entity, wherein the signal indicates the DL BWP and the UL BWP that is equal to or less than the DL BWP.

6. The method of claim 1, wherein the unlicensed band requires listen-before-talk (LBT) sensing.

7. A user equipment (UE) comprising:
a memory storing instructions; and at least one processor coupled with the memory and configured to execute the instructions to:
- transmit a capability signal to a network entity, wherein the capability signal indicates whether the UE is capable of supporting an uplink (UL) bandwidth that is equal to or less than a downlink (DL) bandwidth for communication over an unlicensed band; and
- exchange a signal between the UE and the network entity over the unlicensed band according to the capability signal.

8. The UE of claim 7, wherein the DL bandwidth comprises a DL bandwidth part (BWP), wherein the UL bandwidth comprises a UL BWP.

9. The UE of claim 8, wherein the capability signal indicates that the UE is only capable of supporting the UL BWP that is equal to or less than the DL BWP.

10. The UE of claim 9, wherein exchanging the signal comprises configuring a receive front end (RxFE) of the UE for both DL signal reception and listen-before-talk (LBT) sensing.

11. The UE of claim 9, wherein exchanging the signal comprises receiving the signal from the network entity, wherein the signal indicates the DL BWP and the UL BWP that is equal to or less than the DL BWP.

12. The UE of claim 7, wherein the unlicensed band requires listen-before-talk (LBT) sensing.

13. A method of wireless communication by a user equipment (UE), comprising:
- receiving a signal from a network entity, wherein the signal indicates that short control signal exemption (SCSt) is applied to a synchronization signal block (SSB) transmission of one or more network entities over an unlicensed band; and
- skipping SSB presence detection of the one or more network entities in response to the signal.

14. The method of claim 13, wherein the signal indicates that the SCSt is applied to the SSB transmission of the network entity.

15. The method of claim 14, wherein the signal comprises a system information block (SIB).

16. The method of claim 13, wherein the signal indicates that the SCSt is applied to the SSB transmission of a neighboring cell.

17. The method of claim 16, wherein the signal comprises a system information block (SIB).

18. The method of claim 13, wherein the signal indicates that the SCSt is applied to the SSB transmission of all neighboring cells.

19. The method of claim 18, wherein the signal comprises a system information block (SIB).

20. The method of claim 19, wherein the signal comprises a SIB4, a SIB5, or a configuration signal indicating that the SCSt is applied to the SSB transmission of all neighboring cells in a specific carrier frequency.

* * * * *